(12) United States Patent
Averyanov et al.

(10) Patent No.: US 10,713,847 B2
(45) Date of Patent: Jul. 14, 2020

(54) METHOD AND DEVICE FOR INTERACTING WITH VIRTUAL OBJECTS

(71) Applicants: Vitaly Vitalyevich Averyanov, Tula (RU); Andrey Valeryevich Komissarov, Tula (RU)

(72) Inventors: Vitaly Vitalyevich Averyanov, Tula (RU); Andrey Valeryevich Komissarov, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 282 days.

(21) Appl. No.: 15/735,380

(22) PCT Filed: Jun. 7, 2016

(86) PCT No.: PCT/RU2016/050018
§ 371 (c)(1),
(2) Date: Dec. 11, 2017

(87) PCT Pub. No.: WO2016/200295
PCT Pub. Date: Dec. 15, 2016

(65) Prior Publication Data
US 2020/0027270 A1    Jan. 23, 2020

(30) Foreign Application Priority Data

Jun. 11, 2015   (RU) .............................. 2015122510

(51) Int. Cl.
*G09G 5/00*     (2006.01)
*G06T 19/00*    (2011.01)
*G06T 7/20*     (2017.01)

(52) U.S. Cl.
CPC .............. *G06T 19/006* (2013.01); *G06T 7/20* (2013.01); *G06T 2200/24* (2013.01)

(58) Field of Classification Search
CPC ...... G06T 19/00; G06T 19/003; G06T 19/006
See application file for complete search history.

(56) References Cited

U.S. PATENT DOCUMENTS

2012/0113223 A1   5/2012   Hilliges et al.
2013/0265220 A1   3/2013   Fleischmann et al.
(Continued)

FOREIGN PATENT DOCUMENTS

KR   20100047990 A   5/2010
RU   2011138417 A    3/2012

*Primary Examiner* — Charles Tseng
(74) *Attorney, Agent, or Firm* — Nadya Reingand; Yan Hankin

(57) ABSTRACT

The present group of inventions relates to methods and systems intended for interacting with virtual objects, involving determining a control unit to be used for interacting with virtual objects, determining characteristic graphics primitives of a virtual object, determining the spatial position of the control unit, correlating the spatial position of the control unit to the graphics primitives of the virtual object, and performing the desired actions with regard to the virtual object. In accordance with the invention, images are used from a user's client device which has a video camera and a display, a control unit image library is created on the basis of the received images, and the obtained image library is used for determining the graphics primitives of the control unit. Then, the spatial position of the control unit is determined by calculating the motion in space of the control unit graphics primitives.

8 Claims, 3 Drawing Sheets

(56) References Cited

U.S. PATENT DOCUMENTS

| | | | |
|---|---|---|---|
| 2014/0063054 A1* | 3/2014 | Osterhout | G06F 3/005 |
| | | | 345/633 |
| 2014/0310595 A1* | 10/2014 | Acharya | G06F 9/453 |
| | | | 715/706 |
| 2015/0338915 A1* | 11/2015 | Publicover | G06F 21/64 |
| | | | 345/633 |
| 2016/0078683 A1* | 3/2016 | Sudol | G06T 19/006 |
| | | | 345/633 |
| 2016/0239080 A1* | 8/2016 | Marcolina | G06F 3/011 |

\* cited by examiner

METHOD AND DEVICE FOR INTERACTING WITH VIRTUAL OBJECTS

CROSS-REFERENCE TO RELATED APPLICATIONS

The present patent application is a National stage application from the PCT application No. PCT/RU2016/050018 filed on Jun. 7, 2016, which claims priority to Russian patent application RU 2015122510 filed Jun. 11, 2015.

FIELD OF THE INVENTION

This group of inventions refers to methods and systems designed to interact with virtual objects, in which the governing body by which interaction with virtual objects will be processed determines the characteristic graphic primitives of the virtual object, determines the position in the space of the control body, compares the position in the space of the body management of graphic primitives of the virtual object, performs the desired actions in relation to the virtual object.

The following terms are used in this paper.

A virtual object created by technical means, an object transmitted to a person through his senses: sight, hearing, and others.

The control is that it controls a virtual object, it can be a person, a part of a person, for example, a hand, or an object, in turn controlled by a person, for example, a pointer.

An image library is a database of various images of the same object or subject.

It is desirable to have as much as possible different images in order to obtain the maximum amount of information about the object The method of artificial neural networks is a mathematical model, as well as its software or hardware implementation, made on the principle of the organization and functioning of biological neural networks—networks of a living organism nerve cells.

The Kalman method is an effective recursive filter that estimates the state vector of a dynamic system using a series of incomplete and noisy measurements.

Smartphone (English smartphone—smart phone)—phone, supplemented by the functionality of a pocket personal computer.

Graphical primitives are predefined elements that can be placed in the model with a single command. Each graphic primitive is formed on the basis of a geometric description of the object. They can be such as: a point, a line (a segment), a ray, a line of construction (straight line) that are formed on the basis of a geometric description of the object. They can be such as: a point, a line, a ray, a line of construction (straight line), a shape, a strip, an arc, a circle, a polyline, a rectangle, a polygon (spider bevel), and others. Mainly, these are characteristic points or markers.

BACKGROUND

According to a first of its aspects, the present invention relates to a method of interacting with virtual objects.

Currently, an increasing number of people use various electronic devices and interact with virtual objects. This happens not only in computer games, but also in the learning process, as well as, for example, in remote goods trading, when the buyer makes a decision to purchase using a virtual product model.

Known ways of interacting with virtual objects, which: determine the control device, used for interacting with virtual objects, define the graphics primitives of the virtual object, determine the position of the control device in space, perform correlation of the corresponding position of the control device in space with graphics primitives of the virtual object, perform desired action with respect to the virtual object, but also determine the position of the control device in space by using special devices, such as gloves worn over the user's hand, which transmit the data necessary to calculate the user's hand spatial position. In this example, the user's hand is control. An example of such a glove Dexmo, see the following website http://odnako.su/hitech/gadgets/-187862-dexmo--perchatka-virtualnoy-realnosti-s-obratnoy-svyazyul.

Another example is determining the position in the space of the control device using special devices is the technology using the Kinect device, see the following website http://en.wikipedia.org/wiki/kinect This method is the closest in technical essence and achieved technical result and is chosen for the prototype of the proposed invention as a method.

The disadvantage of this prototype is its complexity, since it requires additional devices, namely the Kinekt device itself, connected to the user's computer device, and there is no possibility of interacting with virtual objects with only one client device of the user having a video camera and display, such as a smartphone, a computer tablet or devices such as augmented reality glasses, which, as a rule, are always with the user.

Indeed, in addition, the device must be specially purchased and also carried with constantly, connected to the client computer device of the user, so that, if necessary, at any time, it is possible to interact with the virtual objects. The need for this kind of interaction is growing rapidly every year and the trend is that soon it will become ubiquitous.

SUMMARY

Disclosure of the Invention as a Method

Based on this original observation, the present invention is mainly aimed at proposing a method of interacting with virtual objects which: defines the control body used for interacting with virtual objects, determines the graphic primitives of the virtual object, determines the spatial position, compares the position of the control body in space with the graphic primitives of the virtual object, performs the desired actions in relation to the virtual object that allows at least to smooth out at least one of the above disadvantages, namely, to provide the possibility of interacting with virtual objects using only one client device of a user having a video camera and a display, such as a smartphone, a computer tablet or devices such as augmented reality glasses, which is the technical task.

To achieve this goal the spatial position of the control body is being determined in the way wherein:

images obtained from a client device comprising a video camera and a display connected to a computing unit adapted for processing data, are used to determine control body spatial position, based on the images obtained, creating a library of images of the control body, which takes into the account different positions in space, brightness, contrast, illumination, and other parameters of the images of the control body, determine graphic primitives of the control body based upon said image library, determine position in the space of the control body by calculating the movement in space of the graphic primitives of the control body, calculate movement in space of the graphic primitives of the control body using adjustment values in order to compensate for the vibration of the client user device.

Due to these advantageous characteristics, it is possible to determine the spatial position of the control body, for example, the user's hand, or a special object, for example, a pointer, using only the client device comprising a video camera and a display, such as a smartphone, computer tablet or glasses-type devices of augmented reality. At any time, the user can see the virtual object on the display of his client device and immediately interact with it. The same client device, specially configured, now performing steps that allow to build a three-dimensional model of the control body and provide interaction between the control body and the virtual object.

There is an embodiment of the invention in which vibration compensation of the user's client device is performed using a Kalman filter.

Thanks to this advantageous characteristic, it becomes possible to simplify the way of interaction with virtual objects, since the sequence of operations when using the Kalman filter minimizes the load on the computational module, which is forced to calculate adjustment values for compensating interferences caused by the vibration of the client device. Such interferences necessarily occur, as a smartphone, a computer tablet or devices such as glasses of augmented reality are used as a client device, which is held by the user in his hands or, like glasses, is attached to the user's head.

Indeed, the frame-by-frame information read from a cell phone camera such as a smartphone or a computer tablet or devices such as augmented reality glasses will carry some noise in the constant scatter of the model's output coordinates around some averaged points. As a result, the user will observe a constant "shaking" of the 3D model.

For this reason, the method contains a step wherein the motions of graphic primitives are predicted, based on the modified Kalman filter. The Kalman filter is an effective recursive filter that estimates the state vector of a dynamic system using a series of incomplete and noisy measurements.

The essence of it's operation can be easiest described by an example. Suppose we get information about the level of fuel in the tank of a moving car. Due to the unevenness of the road and the vibration of the engine, the value will change intermittently due to splashing of the liquid. It is quite logical to consider this a measurement error, paying attention only to a certain average value. At the same time, knowing the average fuel consumption, one can assume what its level will be at the next moment of time. The idea of Kalman is to get the best approximation to the true coordinate value. It is necessary to choose a "golden mean" between the indication of the inaccurate sensor and the predicted value of the fuel consumption law. It is worth noting that the accuracy of the filter depends on the time of its application, which means an ever more stable output of the model on subsequent frames.

There is an embodiment of the invention wherein the image of the control body is captured and a control body and virtual object are shown on the display of a cell phone such as a smartphone.

Thanks to this advantageous characteristic, it becomes possible to use a cell phone such as a smartphone as a client device of the user.

There is an embodiment of the invention wherein the image of the control body is captured and the control body and virtual object are displayed on a tablet computer.

Thanks to this advantageous characteristic, it becomes possible to use the tablet computer as a client device of the user.

There is an embodiment of the invention wherein the image of the control body is captured and the control body and virtual object are displayed by means of devices such as Augmented Reality glasses. Thanks to this advantageous characteristic, it is possible to use the augmented reality glasses as a client device of the user.

There is an embodiment of the invention wherein the model of artificial neural networks is used to calculate the motion in space of graphic primitives of the control body.

Due to this advantageous characteristic, it becomes possible to increase the accuracy of model calculations due to the ability of organizing the process in the form of artificial neural networks. Artificial neural network is a mathematical model, as well as its hardware implementation, based on the principle of organization and functioning of biological neural networks—networks of nerve cells of a living organism. Such networks are used in various fields of science: from speech recognition systems to recognition of the secondary protein structure, also classification of various types of cancer and genetic engineering. ANN (artificial neural network) can be created by simulating a model of neuron networks on a computer. Using algorithms that mimic the processes of real neurons, we can make the network "learn", thereby helping to solve many different problems. The model of a neuron is represented as a threshold. The model receives data from a number of other external sources, determines the value of each input and adds up these values. If the common input is above the threshold, then the block output is one, otherwise it is zero. Thus, the output changes from 0 to 1, when the total "weighted" sum of inputs is equal to the threshold. By providing the network with a pre-known number of graphic primitives, transmitting them by the group to the input at different angles and lighting conditions, and controlling the output values, it will make it possible to use the previously trained neural network in the "engine". In particular, thanks to this module, the "engine" will be able to obtain information about the spatial orientation of the marker, about its prospective position, the location of its graphic primitives, relative to each other, which is later used to make up universal viewports and projection matrices, which allows most modern 3D graphics editors to build the model on an image at a given angle and direction to the viewer.

The set of essential features of the proposed invention is not known from the prior art for methods of a similar purpose, which leads to conclusion that the criterion of "novelty" for the invention with respect to the method is met.

Technological Level of the Invention

In another aspect, the present invention relates to the device for interacting with virtual objects, said device comprising a video camera and a display connected to a computing unit that processes data.

Such a device is described as a Kinect device, see the Internet site http://en.wikipedia.org/wiki/kinect, which connects to the client computer device of the user.

This device is the closest in its technical essence and achieved technical result and is chosen for the prototype of the proposed invention as a device.

The disadvantage of this prototype is its complexity, since it requires a whole system of several devices, that is, the client computer device of the user with the display and additional devices, namely the Kinect device itself connected to the computer device of a user. At the same time, there is no possibility of interaction with virtual objects with the help of only client device having a video camera and a display, such as a smartphone, a computer tablet or devices such as glasses of augmented reality, which, as a rule, are always with the user.

Indeed, in addition, the device must be specially purchased and also carried with constantly, connected to the client computer device of the user, so that, if necessary, at any time, it is possible to interact with virtual objects.

Disclosure of the Invention as a Device

The present invention, on the other hand, mainly aims to propose a device for interacting with virtual objects, comprising a video camera and a display connected to a computational module that processes data allowing to address at least one of the above-mentioned disadvantages, namely, to address the technical objective of providing the ability to interact with virtual objects using only one client device of the user comprising a video camera and a display.

In order to achieve this objective, the device has an additional electronic module for compiling and storing an image library of the images of the control body interacting with the virtual object, connected to the above-described computing module, the output of which is connected to an input of an electronic module for constructing graphic primitives of the control body based upon the image library, the output of which is connected to the input of the electronic module for determining the position of the graphic primitives of the control body in space, the output of which is connected to the input of the electronic module for calculation of adjustment values for compensating the vibration of the client device of the user.

Thanks to these advantageous characteristics, it is possible to determine the position of the control body in space, for example, the user's hand, or a special object, for example, a pointer, with only one client device of the user having a video camera and display, such as a smartphone, computer tablet or devices like augmented reality glasses. At any time, the user can see the virtual object on the display of his client device and immediately interact with it.

There is also an embodiment of the invention, in which the device additionally contains a module for calculating the movement in space of the graphic primitives of the control body using a model of artificial neural networks, connected to the computational module.

Thanks to this advantageous characteristic, it would be possible to increase the accuracy of the models built for interaction with a virtual object, wherein the accuracy increases with the interaction time, as a result of automatic device tuning.

The set of essential features of the proposed invention as a device is not known from the state of the art for devices of a similar purpose, which leads to conclusion that the criterion of "novelty" is met for the invention as a device.

BRIEF DESCRIPTION OF THE DRAWINGS

Other distinctive features and advantages of this group of inventions clearly follow from the description given below for illustration and not being limiting, with reference to the accompanying drawings wherein.

Figure 1:
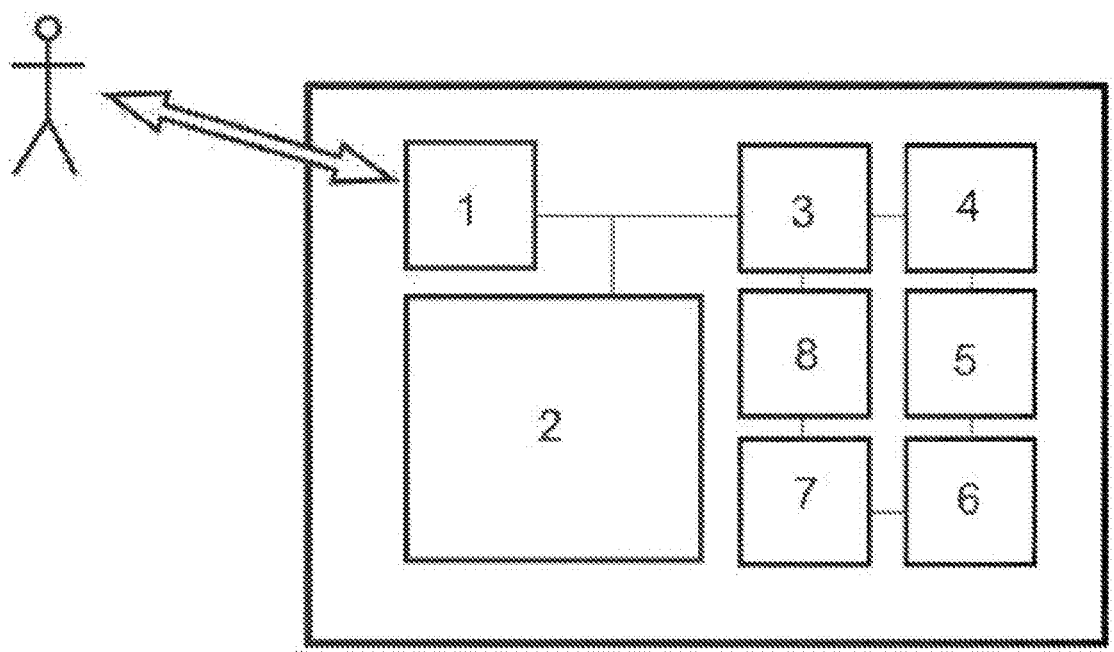
FIG. 1 is a functional diagram of the device for interacting with virtual objects in accordance with the invention, FIG. 2 schematically shows the stages of a method for interacting with virtual objects according to the invention.

According to FIG. 1 the device for interacting with virtual objects comprises a video camera 1 and a display 2, connected to a computing unit 3 that processes the data. The device additionally has an electronic module 3 for editing and storing an image library of the virtual object control body that is connected to the input of the electronic module 5 for constructing the graphic primitives of the image library control. The latter is connected to the input of the electronic module 6 adapted to determine of graphic primitives of the control body in space, whose output is connected to the input of the electronic correction module 7, adapted to compensate for the vibration of the client device of the user.

In addition, the device can comprise a module 8 for calculating the motion in space of the graphic primitives of the control body using the model of artificial neural networks, connected to the computational module.

DETAILED DESCRIPTION OF THE PREFERRED EMBODIMENTS

The device for interacting with virtual objects works as follows. We will give the most exhaustive example of the implementation of the invention, bearing in mind that this example does not limit the application of the invention.

Figure 2:
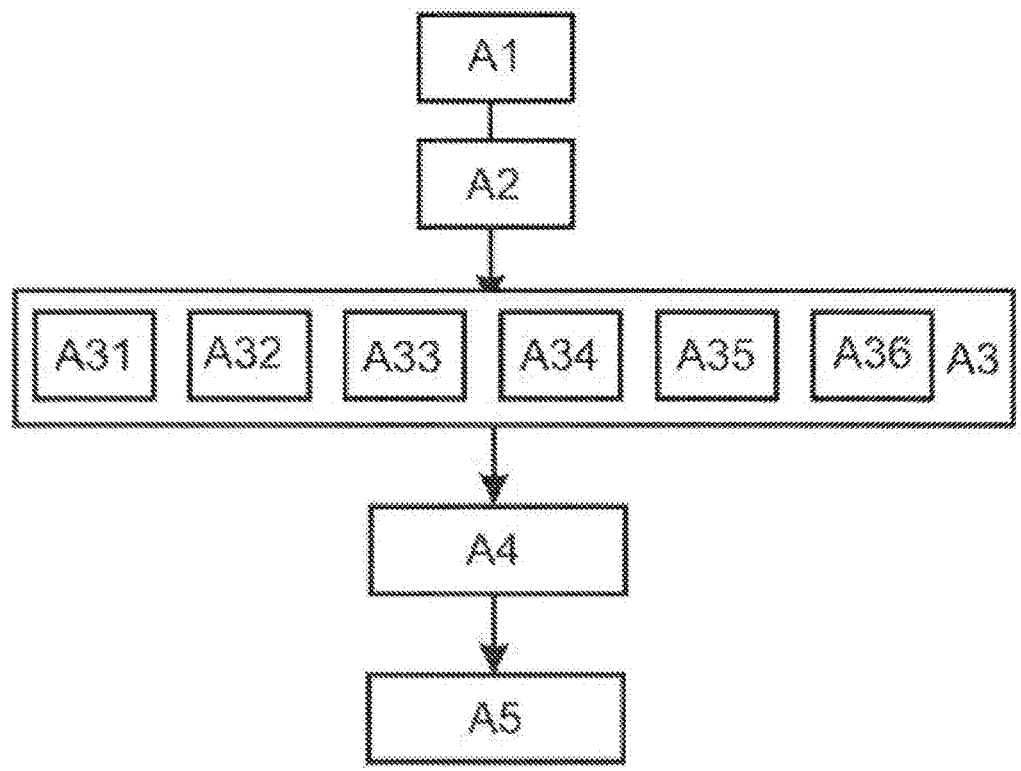

According to FIG. 2:

Step A1. Preliminarily determining a control body for interaction with virtual objects. Determining whether it would be, for example, a part of the user or some object.

Step A2. Defining graphic primitives of the virtual object.

Step A3. Determining spatial position of the control body.

Step A31. Using images of the client device comprising a video camera and display connected to data processing computing to obtain data of the control body spatial position.

Step A32. Creating a library of images of the control body based on the images obtained, that takes into account different positions in the space, brightness, contrast, illumination, and other parameters of the image of the control body.

Step A33. Determining the graphic primitives of the control body based on the resulting image library.

Step A34. Determining spatial position of the control body by calculating the movement in space of the graphic primitives of the control body.

Step A35. Calculating spatial motion of the graphic primitives of the control body using of adjustment values for compensating vibration of the user's client device. For example, vibration compensation of a user's client device can be performed using a Kalman filter.

Step A36. Using a model of artificial neural networks is used for calculating spatial motion of graphic primitives of the control body.

Step A4. Comparing spatial position of the control body to the graphic primitives of the virtual object.

Step A5. Rendering the control body and the virtual object using a display of a cell phone such as a smartphone, a tablet computer, or devices such as augmented reality glasses.

The sequence of stages is exemplary and allows one to rearrange, subtract, add or perform some operations simultaneously without losing the ability to interact with virtual objects.

EXAMPLE 1

Technology of Interaction with Virtual Objects

The technology of interaction between real and virtual objects is based on the recognition of images, namely the method of comparison with the template. A virtual object is associated with a certain real object, and the change of the second directly affects the change of the first:

A virtual object can be moved, its properties can be changed by moving or changing the properties of the real object.

First, it is necessary to create a library of images of a real object, with the help of which a virtual object (active marker) will be manipulated. The virtual object itself can be displayed on its marker (passive marker) or not used at all.

In the case of a flat marker, only one image for each marker is needed. Using the camera, the specified images in the surrounding world are searched. The marker can be applied to the surface of any object in any way, but it must retain the original shape (scaling is allowed while maintaining proportions). As a rule, it is a sheet of dense material with a characteristic image applied to it. However, the marker can be not only an image, but also a three-dimensional object. In this case, one would need several marker images (at least two) added to the template library.

When detecting a passive marker, its perspective and orientation are calculated, and the coordinates of its edges are specified. A reference frame is constructed relative to its plane. If there are several markers, each one has its own reference frame, and they are given an identification numbers. Then an active marker is input in the area of sight. Its movements are calculated relative to the reference frame of the passive marker, also its edges and orientation in space. After that, using an active marker, one can interact with a virtual object.

A 3D model associated with the passive marker is projected to it, it can be either animated or static. Due to the developed coordinate system, when the camera is moving, the position of the model relative to the marker does not change, so the virtual model can also be moved using real marker movements.

Markers (passive and active) can be correlated not only with the 3D model, but also with the audio and video track, and the 3D scene (a set of interacting 3D models). In the latter case, when interacting with a passive marker, models can be deleted or added from the scene.

The interaction of real and virtual objects in general comes down to two methods: interaction on the planar surface and interaction in space.

A 2D (interaction on the planar surface). In this case, the depth is not taken into account, the location of the real and virtual objects is calculated in flat coordinates. An example of using this approach can be pressing the virtual button with a real object (for example, a finger). When the passive marker is overlapped by the active marker, the specified action is performed.

3D (interaction in space). In this case, depth is taken into account as the third coordinate. It can be obtained by processing several frames and performing 3D reconstruction, as well as by using additional equipment, such as a rangefinder or other device that allows to measure the distance to the object. Unlike the first method, capable of working with the first frame, more frames are needed here to find out the geometric dimensions of the active marker and the 3D model. This method allows more discretion. Using the example of a human hand as an active marker, you can not only move a virtual object in space, but also, using certain gestures with your fingers, compress it, stretch it, disassemble it into its component parts (if the 3D model itself allows it).

EXAMPLE 2

Possibility to Manipulate Virtual Objects

The device in the user's hands (for example, a tablet computer) stores in its memory the drawings of a certain assembly of parts. Using the camcorder, the device receives data from the environment. This video stream is filtered (Laplacian). A marker is located in the image, using the key point descriptor comparison. The homography of the marker, orientation in space and other characteristics are calculated, and on the basis of them a composite 3D-model of the assembly is made up, and its drawing is a marker. Next, the hand of the user is input into the frame as an active marker, which is the control body, the template library of which is also present in the device's memory. Thanks to the use of all three coordinates, it is possible to "disassemble" the structure into individual parts with the help of hands as active markers. In particular, the depth characteristic here is used to find out whether the user "grabbed" the part with his fingers.

EXAMPLE 3

An Example of Constructing a Three-Dimensional Model Based on Characteristic Points (Graphic Primitives)

Figure 3:
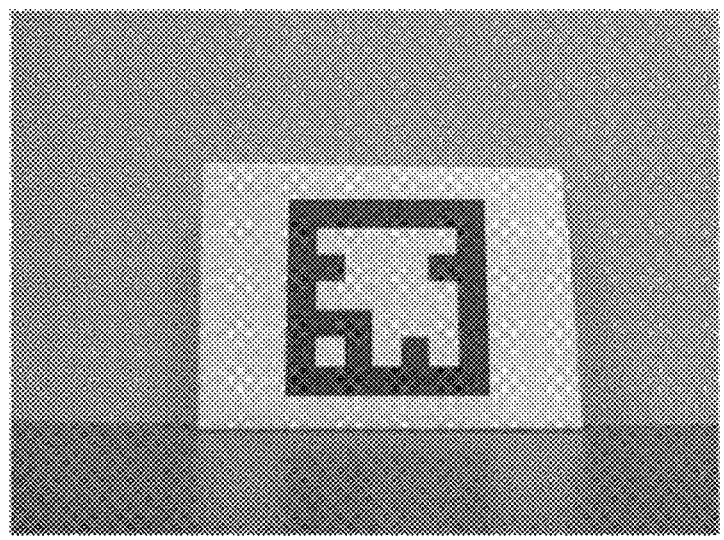
FIG. 3 schematically depicts the Original image.

A binary image applied to a piece of paper is used as a marker. FIG. 3 shows the original image.

The preloaded marker image and a frame coming from the camera are analyzed for the presence of graphic primitives—angles, sharp gradients, etc.

Figure 4:
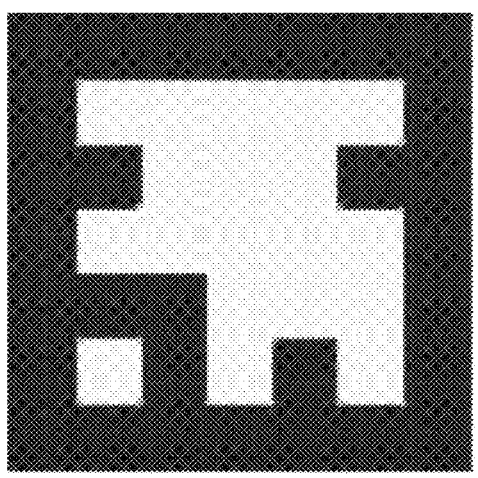
FIG. 4 schematically shows a marker with the found key points
Figure 5:
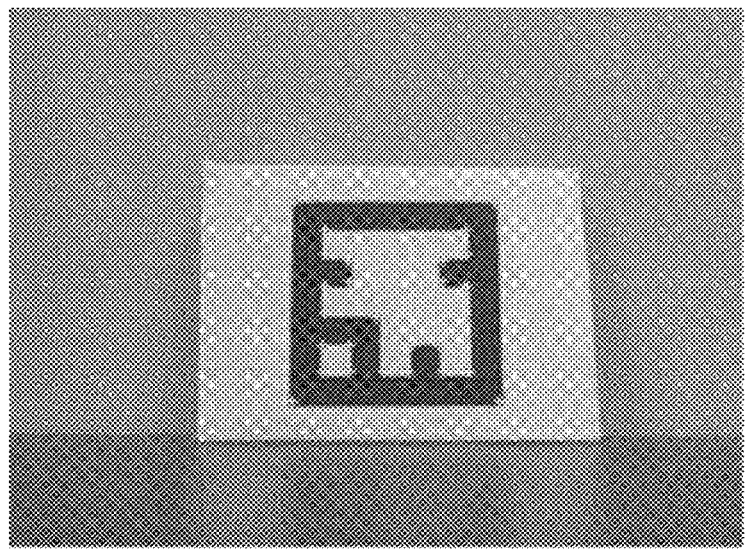
FIG. 5 schematically depicts a frame with the found key points

FIG. 4 shows a marker with the characteristic points detected. And in FIG. 5 a frame with the detected characteristic points is shown.

Figure 6:
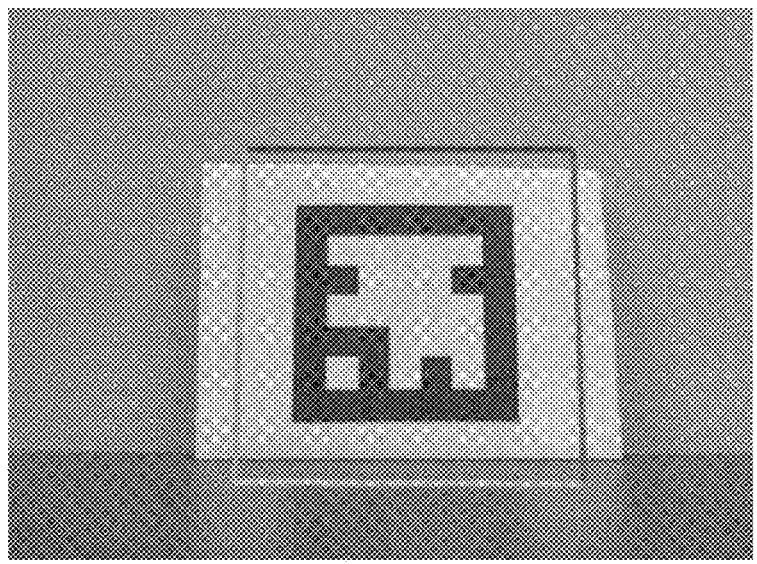
FIG. 6 schematically shows a framed marker

Then descriptors for the marker and frame are calculated. After the calculation, the descriptors are compared. This comparison allows you to find out the spatial orientation of the marker image and, as a first approximation, frame it. (Refer to FIG. 6). Different colors of the frame sides at this stage make it possible to track the correctness of the calculation of the spatial orientation of the marker frames.

INDUSTRIAL APPLICABILITY

The proposed method and the system of interaction with virtual objects can be implemented by a person skilled in the art and, when implemented, ensure the implementation of the declared intention that allows to conclude that the criterion of "industrial applicability" for the invention is met.

In accordance with the invention, a prototype device for interacting with virtual objects is manufactured.

Tests of the system prototype showed that it provides the following capabilities:

Receiving spatial position data of the control body image from the client device of the user;

Creating a library of images of the control body based on the images obtained, that takes into account different positions in the space, brightness, contrast, illumination, and other parameters of the image of the control body, Determining spatial position of the control body by calculating the movement in space of the graphic primitives of the control body.

Determining the graphic primitives of the control body based on the resulting image library.

further interacting with virtual objects using only one client device of the user.

Thus, the present invention achieves the assigned objective of providing the ability to interact with virtual objects using only one client device of a user having a video camera and a display.

What is claimed is:

1. A method of interaction with a virtual object, comprising:
   determining a control body adapted for interacting with the virtual object,
   determining characteristic graphic primitives of the virtual object,
   determining a spatial position of the control body,
   comparing the spatial position of the control body with the characteristic graphic primitives of the virtual object, and
   performing desired actions with respect to the virtual object,
   wherein said determining the spatial position of the control body comprises:
      obtaining spatial position information of the control body using images from a client device of a user, the client device comprising a video camera and a display connected to a computing unit that processes data,
      creating a library of images of the control body from the images from the client device, taking into account different positions in space, brightness, contrast, illumination, and other parameters of the images of the control body,
      determining characteristic graphic primitives of the control body from the library of images of the control body, and
      determining the spatial position of the control body by calculating a spatial movement of the characteristic graphic primitives of the control body, and
      calculating the spatial movement of the characteristic graphic primitives of the control body using vibration compensation adjustment values to perform vibration compensation for the client device of the user.

2. The method according to claim 1, wherein the vibration compensation is performed using a Kalman filter.

3. The method according to claim 1, wherein the images of the control body are captured by a cell phone and the control body and the virtual object are depicted on a cell phone display.

4. The method according to claim 1, wherein the images of the control body are captured by a tablet computer and the control body and the virtual object are depicted on a tablet computer display.

5. The method according to claim 1, wherein the images of the control body are captured by, and the control body and the virtual object are depicted on, augmented reality glasses.

6. The method according to claim 1, wherein a model of artificial neural networks is used to calculate the spatial movement of the characteristic graphic primitives of the control body.

7. A client user device for interacting with a virtual object, comprising:
   a video camera and a display connected to a data processing unit, and
   an electronic module, the electronic module being configured for:
      determining a control body adapted for interacting with the virtual object,
      determining characteristic graphic primitives of the virtual object,
      determining a spatial position of the control body,
      comparing the spatial position of the control body with the characteristic graphic primitives of the virtual object, and
      performing desired actions with respect to the virtual object,
      wherein said determining the spatial position of the control body comprises:
         obtaining spatial position information of the control body using images from the client user device,
         creating a library of images of the control body from the images from the client user device, taking into account different positions in space, brightness, contrast, illumination, and other parameters of the images of the control body,
         determining characteristic graphic primitives of the control body from the library of images of the control body, and
         determining the spatial position of the control body by calculating a spatial movement of the characteristic graphic primitives of the control body, and
         calculating the spatial movement of the characteristic graphic primitives of the control body using vibration compensation adjustment values to perform vibration compensation for the client user device.

8. The client user device according to claim 7, further comprising:
   a module for calculating the spatial movement of the characteristic graphic primitives of the control body using a model of artificial neural networks, said module for calculating the spatial movement of the characteristic graphic primitives of the control body being connected to the data processing unit.

* * * * *